United States Patent [19]
Dotson, Jr.

[15] 3,706,495
[45] Dec. 19, 1972

[54] METHOD OF MEASURING THE VELOCITY OF A SMALL MOVING OBJECT

[72] Inventor: William P. Dotson, Jr., P.O. Box 507, Roberts Drive, Dickinson, Tex. 77539

[22] Filed: July 31, 1970

[21] Appl. No.: 60,006

[52] U.S. Cl. ................................356/28, 356/162
[51] Int. Cl. ........................G01p 3/36, G01b 11/00
[58] Field of Search................356/28, 106, 156, 162; 350/3.5

[56] References Cited

UNITED STATES PATENTS 3,563,652   2/1971   Powell et al. ..........................350/3.5
3,520,610   7/1970   Parrent, Jr. et al. ....................350/3.5

OTHER PUBLICATIONS

Denisyuk et al., " The Holographic Recording of Objects That Are Moving During Exposure," Soviet Journal of Optical Technology, Vol. 36 No. 6 pp. 747–748
Kurtz et al., "A Holographic Technique for Recording a Hypervelocity Projectile With Front Surface Resolution, applied Optics, 5–1970, pp. 1040–1043

Primary Examiner—Benjamin A. Borchelt
Assistant Examiner—S. C. Buczinski
Attorney—Marvin J. Marnock, Marvin F. Matthews and John R. Manning

[57] ABSTRACT

The velocity of a small moving particle is determined by allowing the particle to pass between a laser light source and a photographic film or plate. The laser is caused to illuminate the photographic film with coherent plane-wave light for a short interval of time while the particle is between the laser and the film to thereby record a hologram pattern on the film. The duration of the exposure time is made such that the particle moves a noticeable distance during such exposure time. The exposed photographic film is developed and the velocity of the particle is determined by analysis of the developed film. In one embodiment, the velocity is determined by scanning the film with a microdensitometer and measuring the separation distance between phase reversal points on the microdensitometer trace. In another embodiment, the velocity is determined by reconstructing an image from the hologram pattern on the film and measuring the path length of the particle in the reconstructed image.

11 Claims, 11 Drawing Figures

William P. Dotson, Jr.
INVENTOR

BY M J Marnock
ATTORNEY

William P. Dotson, Jr.
INVENTOR.

BY M J Marnock
ATTORNEY

METHOD OF MEASURING THE VELOCITY OF A SMALL MOVING OBJECT

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to methods of measuring velocities of moving objects by means of holographic techniques.

Various situations arise wherein it is desired to measure the velocity of a small moving particle whose largest dimension is a fraction of a millimeter or less. Such particle may be moving by itself or may be one of a large number of such particles moving as a group through a sample volume or observation region. As one example, it would be desirable to measure the velocities of individual micrometeorites just before they strike the hull of a spacecraft. This would lead to an improved understanding of the damage caused to such spacecraft by such micrometeorites. As another example, it would be desirable to measure the dispersion rates of contaminants around a spacecraft when in flight. As a further example, the ability to accurately measure particle velocities would enable the making of flow studies by means of fluids seeded with large numbers of micron-size particles.

At first glance, it would appear that it might be possible to use ordinary photographic techniques for accomplishing this purpose. Such techniques, however, suffer from various limitations. For one thing, the particle or particles would not remain in one position long enough for the recording camera to focus on them. In many cases, the distance of a particle from the camera lens would not be known in advance. Thus, since the particle is moving, there would frequently be insufficient time in which to bring the camera into focus. Such lack of focus leads to a blurred image. It also causes a loss of information as to the distance between the object and the recording film, which information is needed in order to calculate the particle velocity. For the case of a three-dimensional volume of many particles, it would be impossible to focus on all of them at one and the same time. Also, even for fairly moderate particle densities, there would be frequent confusion and overlapping of particle traces on the recording film.

There has, in recent times, been developed a new photographic technique known as holography or photography by wave-front reconstruction. Holography has the capability or recording three-dimensional information and does not require the bringing into focus of the objects being studied. Thus, such technique may offer a solution to the present problem. In fact, it has been recently proposed by others to measure the velocities of small moving particles by taking holograms of them. The procedure of this recent proposal is to make a hologram by momentarily illuminating the particle region with a pulsed laser and photographically recording the transmitted light. A pulsed laser of extremely short pulse duration is used to freeze the motion of the particles. Such laser is turned on or pulsed at two spaced points in time, the time interval between which is precisely known. Thus, when the image is later reconstructed from the resulting hologram, each particle will appear at two different locations, corresponding to its positions at the two instants when the laser was pulsed. By measuring the distance between the two image locations for a given particle and by knowing the time interval between laser pulses, the velocity of the particle can be determined.

Unfortunately, this proposed holography technique has several drawbacks. For one thing, when there are a large number of particles, it is difficult to determine whether a particle in the reconstructed image represents the second position of a given particle or the first position of some other particle, unless the density and distribution of the particles are carefully controlled to avoid this ambiguity. In some applications, such as controlled flow studies, it may with careful effort be possible to establish the necessary particle density and distribution pattern. Even so, the limitations on the particle densities limits the usefulness of the proposed technique. In other cases, however, such as the study of contaminants about a spacecraft, it will be impossible to exercise any appreciable control over the particle density and distribution. In such cases, the proposed technique will sometimes by completely inadequate.

SUMMARY OF THE INVENTION

It is an object of the invention, therefore, to provide new an improved methods of measuring velocities of small moving objects which substantially avoid one or more limitations of the previously proposed methods.

It is another object of the invention or provide new and improved methods of measuring the velocities of individual particles in a group comprising a large number of moving particles, which methods do not require special densities and distributions for the particles.

In accordance with the invention, a method of measuring the velocity of a small moving object comprises making a hologram of the moving object. The method further comprises making the exposure time for the hologram of such duration that the object moves a noticeable distance during such exposure time.

For a better understanding of the present invention, together with other and further objects and features thereof, reference is had to the following description taken in connection with the accompanying drawings, the scope of the invention being pointed out in the appended claims.

BRIEF DESCRIPTION OF THE DRAWINGS

Referring to the drawings.

DESCRIPTION OF THE PREFERRED EMBODIMENTS

Figure 1:
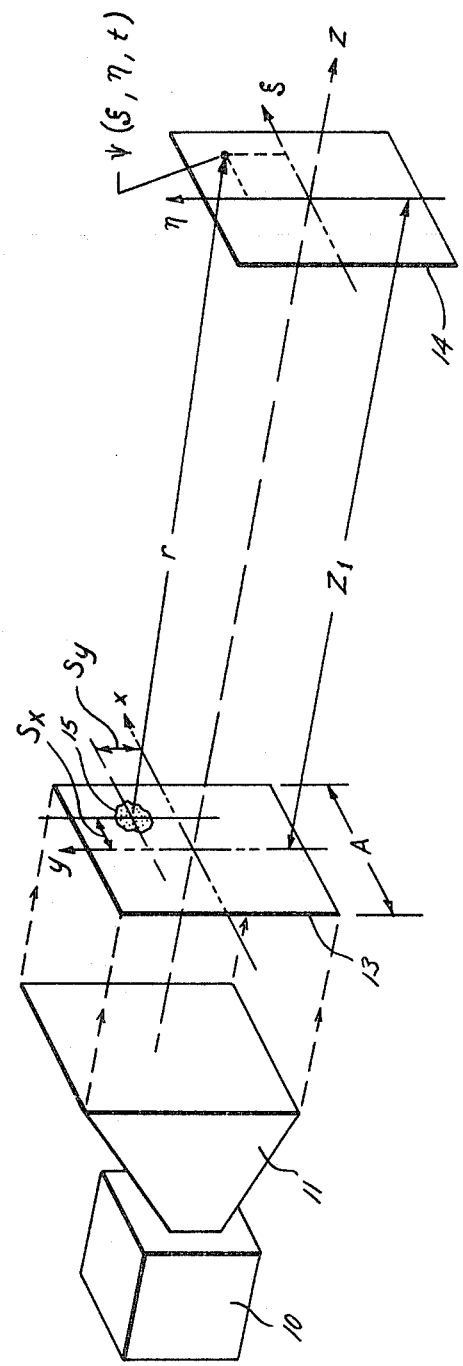
FIG. 1 is a perspective view of the principle components of a hologram recording system used in practicing one embodiment of the invention.

Referring to FIG. 1, there is shown in a conceptual or diagrammatic manner a hologram recording system for making an in-line Fraunhofer type hologram of a moving object. The system includes a coherent light source in the form of a laser 10 having located at the light output window thereof an autocollimator device 11 for producing a broadened beam of coherent plane-wave light. The parallel rays of this broadened plane-wave beam pass through an object plane 13 and fall on a photographic film or plate 14. These light rays travel in a direction substantially perpendicular to the plane of the film 14. The object plane 13 is an imaginary plane used to denote the plane in which moves the object or particle to be measured. A typical object or particle, the size of which is greatly exaggerated for explanatory purposes, is indicated at 15. The object plane 13 is preferably substantially parallel to the plane of the photographic film 14. The various graphical coordinate lines depicted in FIG. 1 will be referred to in explaining the theory of the invention.

A basic concept of the present invention relates to the proper control of the exposure time during which the laser beam from laser 10 is allowed to illuminate the recording film 14. In particular, it is of critical importance that this exposure time be of such duration that the object 15 moves a noticeable distance during such exposure time. As a minimum limit, the object 15 must move a distance greater than its mean dimension in the direction of movement during the exposure time. As a maximum limit, the movement of the object must not exceed a distance greater than 10 times its means dimension in the direction of movement during the exposure time.

The exposure time can be controlled in either of two primary ways. One way is to use as the laser 10 a pulsed laser and to control its pulse width to obtain the proper exposure time. The other way is to use a continuous-wave laser together with a mechanical shutter mechanism disposed across the light path at some point intermediate the autocollimator 11 and the recording film 14. Due to limitations in the maximum speed of operation of a mechanical mechanism, it will be necessary to use a pulsed laser when working with very high velocity particles.

The concept of allowing the object or particle to move a noticeable distance during the exposure time runs directly contrary to the thinking of various present-day authorities in the field of holography. It has been heretofore believed that any appreciable movement of the object during the exposure time would cause confusion and distortion in the recorded hologram interference pattern and would thereby destroy its usefulness. Thus, past efforts have been in the direction of using extremely short exposure times for, in effect, freezing the movement of the object. The present invention, however, demonstrates that this previous thinking is incorrect, provided the proper relationship between object velocity and exposure time is maintained. This basic discovery, in turn, leads to the improved method of velocity measurement of the present invention.

In view of the foregoing, it is helpful to consider in some detail the theory of the present invention and to compare the results predicted by such theory with the results obtained by measurements made on actual moving objects. For purposes of mathematical derivation, it is most convenient to define the amplitude of the light field at any given point on the object plane 13 as seen when looking into such plane from the recording film side thereof as follows:

$$\psi(x,y) = \psi_r(x,y) + \psi_o(x-s_x, y-s_y) \quad (1)$$

where $\psi$ denotes the total amplitude of the light at any given point on the object plane, $\psi_r$ denotes the component of the total amplitude due to the incident light field, $\psi_o$ denotes the component of the total amplitude due to the object 15, $x$ and $y$ denote the coordinates of a coordinate system lying in the object plane and centered on the optical axis (the $z$ axis) of the system and $s_x$ and $s_y$ denote the $x$ and $y$ coordinates of the displacement of the center of the object 15 from the center point of the $xy$ plane. Thus, it is convenient to think of the amplitude field across the object plane 13 (as viewed from the right) as being composed of a constant reference field which is modified over the object cross section by the light transmission characteristics of the object. In other words, the $\psi_o$ term denotes the light that is lost because of the presence of the object 15, such term having a value of zero at all points except over the object cross section. If the reference field from the laser 10 is assumed to have an amplitude value of K at the $xy$ plane and if the object is opaque, then $\psi_o$ will have a value of $-K$ over the object cross section.

It is noted that the present embodiment is using a back-lighted form of holography wherein the reference "beam" is in line with the object "beam".

In order to determine the geometry of the interference patterns produced on the photographic film 14, it is necessary to determine the light amplitude resulting at each point in the recording plane corresponding to the plane of the film 14. For purposes of explanation, the points on the recording plane of film 14 are described in terms of a $\xi\eta$ coordinate system lying in such plane and centered on the optical axis $z$ of the system. The light amplitude at each point in the recording plane film 14 may be described by the following relationship:

$$\psi(\xi,\eta) = \psi_r(\xi,\eta) + \psi_o(\xi,\eta) \quad (2)$$

Thus, the total light amplitude at each point in the $\xi\eta$ plane represents the superposition of an object field component $\psi_o$ on a reference field component $\psi_r$. As is known, these components combine in constructive and destructive manners at different points to produce the hologram interference fringes.

It can be shown that, to a close approximation, the reference field component is described by the relationship:

$$\psi_r(\xi,\eta) = K \exp(-ikz_1) \quad (3)$$

provided there is no appreciable divergence of the light beam over the region of the $\xi\eta$ plane being considered. In Equation (3), $K$ denotes the amplitude of the reference field component at any point on the object plane 13 in the absence of the object 15, the expression "exp" denotes that the immediately following term is an exponent of $e$ (the base of the natural logarithm system), $i$ denotes the usual vector operator ($i = \sqrt{-1}$), $z_1$ denotes the separation distance between object plane of film 13 and the recording plane 14, and $k$ is described by the following expression:

$$k = 2\pi/\lambda \quad (4)$$

where $\lambda$ denotes the wavelength of the coherent light from the laser 10. The exponential term in Equation (3) is a phase term relating the phase of the light waves at the recording plane to the phase of such waves at the object plane 13, a phase of 0° being assumed for the waves at the object plane 13. The validity of the relationship of Equation (3) is confirmed by DeVelis and Reynolds in their text "Theory and Applications of Holography", published by the Addison-Wesley Publishing Company in 1967.

Considering the object field component as a summation of a number of point sources and applying Huygens' principle, the differential field at any given point on the $\xi\eta$ plane produced by the object field component at any given point on the object cross section is described by the following relationship:

$$d\psi_o(\xi,\eta) = \theta\psi_o(X-S_x, Y-S_y)dx\,dy(1/r)\exp(-ikr) \quad (5)$$

where $\theta$ denotes the inclination factor or obliquity factor for a Huygens secondary wavelet source and $r$ denotes the distance between the point on the $xy$ plane and the point on the $\xi\eta$ plane being considered.

From Equation (5), it can be shown that the total object field component at any given point on the recording plane 14 can be described by the following relationship:

$$\psi_o(\xi,\eta) = \exp(-ikz_1)\,CLT\exp[ik(\xi S_x + \eta S_y)/Z_1] \quad (6)$$

where the factors $C$, $L$ and $T$ are described by the following relationships:

$$c = \theta/Z_1 \quad (7)$$

$$L = \exp[-ik(\xi^2+\eta^2)/2Z_1] \quad (8)$$

$$T = \int \psi_o(x,y)\exp[ik(\xi x+\eta y)/z_1]dx\,dy \quad (9)$$

The relationship of Equation 6) is not known in the literature and is believed to have been first derived in the course of development of the theory underlying the present invention. The separation of the displacement term containing the $s_x$ and $s_y$ factors from the integral term represented by $T$ is an important result of this derivation. It enables the development of a separate distribution function for the displacement of the object, as a function of time, during the exposure period. Equation (6) is derived by taking the integral of both sides of Equation (5), evaluating $r$ is terms of the coordinates $x, y, \xi, \eta$ and $Z_1$, substituting the result into the integral and simplifying to obtain the Fresnel integral solution for the total object field component at any given point on the recording plane 14. Certain assumptions are then made and the Fourier translation theorem is applied to reduce the Fresnel integral to the Fraunhofer type integral of Equation (6).

The basic assumption which is made in obtaining the Fraunhofer solution of Equation (6) is that the path length traversed by the object during the exposure time is very small compared to the separation distance $z_1$ between the object plane 13 and the recording plane 14. More precisely, the assumption is made that:

$$z_1 \geq R^2/\lambda \quad (10)$$

where $R$ denotes the overall dimension of the loci of points occupied by the object in the direction of movement thereof during the exposure time or, in other words, the path length for the object during the exposure time. For the more usual case of stationary objects, the argument $r$ is replaced by the object dimension $d$ and the result is:

$$z_1 \geq d^2/\lambda \quad (11)$$

where $d$ denotes the mean dimension of the object in the direction of object movement being considered. For a small particle, $d$ denotes the mean diameter of such particle. Thus, the basic assumption further requires that the mean dimension of the object in the direction of movement also be very small compared to $Z_1$.

Figure 2:
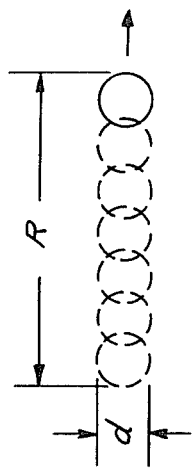
FIG. 2 illustrates diagrammatically the movement of a small particle.

The physical significance of these $R$ and $d$ terms is illustrated in FIG. 2 for the case of a spherical particle. If the particle moves with approximately constant velocity during the exposure time, then the following relationship also holds:

$$R = v\tau \quad (12)$$

where $v$ denotes the velocity of the particle and $\tau$ denotes the exposure time.

The first exponential term in Equation (6) is a phase term relating the phase of the light waves at the recording plane 14 to the phase of such waves at the object plane 13. The $C$ term of Equation (6), as defined in Equation (7), is essentially a constant. The $L$ term of Equation (6), as defined in Equation (8), is the so-called lens term and will vary as a function of the location of the point being considered in the $\xi\eta$ plane. This $L$ term is determined by the object to recording plane distance during the recording of the hologram pattern. It controls the formation distance at which the image will be formed during the subsequent image reconstruction process. The T term of Equation (6), as defined in Equation (9), is a geometry term which represents the effect of the object size and shape on the resulting hologram pattern. The last exponential term in Equation (6) is a displacement term which represents the effect of the displacement of the object from the optical axis $Z$ on the resulting hologram pattern. As indicated above, the separation of this displacement term from the geometry term $T$ enables a separate evaluation of the effect of the movement of the object during the observation period or exposure period.

Inserting the relationships of Equations (3) and (6) into Equation (2) and making the displacement factors $s_x$ and $s_y$ time dependent gives the following relationship:

$$\psi(\xi,\eta,t) = K\exp(-ikz_1 + \exp(-ikz_1)CLT\exp\{ik[\xi S_x(t) + \eta s_y(t)]/z_1\} \quad (13)$$

where $t$ denotes time. Equation (13) describes the net light wave amplitude at any given point in the $\xi\eta$ recording plane at any given instant of time. Converting this expression for instantaneous amplitude into an expression for instantaneous intensity and integrating the resulting intensity expression over the exposure interval gives the following relationship for the total energy $J$ received by any given point on the photographic film during the exposure interval:

$$J(\xi J(\xi,\eta,\pi) = \pi + |CT|^2\pi + CLTV + c^*L^*T^*V^* \quad (14)$$

where:

$$V = \int_{-\tau/2}^{\tau/2} exp\left\{\frac{ik[\xi s_x(t) + \eta s_y(t)]}{z_1}\right\}dt \quad (15)$$

and where the asterisk (*) symbol denotes that the term bearing same is the conjugate of the term without same. In these latter steps, the common phase term $exp(-ikz_1)$ of Equation (13) was removed and the reference field amplitude $K$ was assumed to be equal to unity. As previously indicated, $\tau$ denotes the length of the exposure interval.

The total energy function $J$ determines the resulting density at any given point on the photographic film 14 after such film is developed by use of the usual chemical solutions. Thus, the relationship of Equation (14) enables a calculation of the density values at each of the different points on the developed film. Thus, Equation (14) can be used to plot the hologram interference patterns that will appear on such developed film, assuming the response of the film is linear with respect to time.

The first two terms in Equation (14) represent a background field which is essentially constant. On this background field, the third and fourth terms of Equation (14) impress variations proportional to the object geometry and the displacement of the object as a function of time. Attention may be restricted to the third term of Equation (14) because the fourth term is simply the conjugate of the third term. In the third term, only the last three factors, namely, $L$, $T$ and $V$, need be considered because the first factor $C$ is essentially a constant. In other words, $L$, $T$ and $V$ represent the factors which will vary from point to point on the photographic film. These factors or functions are set forth in Equations (8,) (9) and (15,) (15), respectively.

To understand how these variable factors, $L$, $T$ and $V$ affect the recorded hologram pattern, it will be assumed that the object being observed has a square cross section with each side of the square being of length $d$, that the object is moving along the x-axis in the object plane 13, that the object is moving at a constant velocity $v$ and that the object is opaque.

With these assumptions in mind, the variation of the lens term $L$ of Equation (8) along the $\xi$-axis in the recording plane is described by the following relationship:

$$L' = a \sin(k\xi^2/2z_1) \quad (16)$$

where $L'$ denotes the lens function along the $\xi$-axis and $a$ denotes a proportionality constant.

Performing the indicated integration for the geometry term $T$ of Equation (9) and expressing the results in terms of the variation that will be produced along the $\xi$-axis gives the following relationship:

$$T' = b[\sin(k\xi d/2z_1)/(k\xi d/2z_1)] \quad (17)$$

where $T'$ denotes the geometry function along the $\xi$-axis and $b$ denotes a proportionality constant.

In view of the foregoing assumptions, $s_x(t) = vt$ and $s_y(t) = 0$. Substituting these values into Equation (15), performing the indicated integration for the displacement term $V$ of Equation (15) and expressing the results in terms of the variation that will be produced along the $\xi$-axis gives the following relationship:

$$V' = c[(\sin k\xi v\pi/2z_1)/k\xi v\pi/2z_1)] \quad (18)$$

where $V'$ denotes the displacement function along the $\xi$-axis and $c$ denotes a proportionality constant.

Figure 3A:
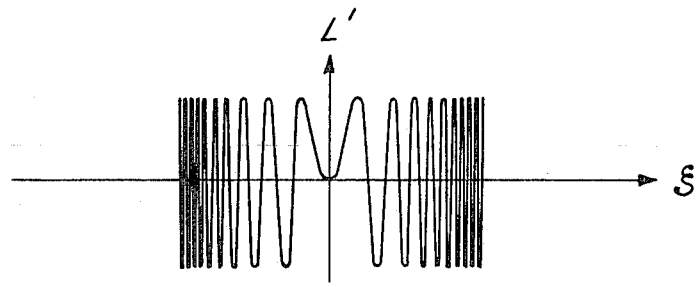
FIGS. 3A, 3B and 3C are graphs showing principle variable components of the light energy received along a given line of the recording film during the exposure time.
Figure 3B:
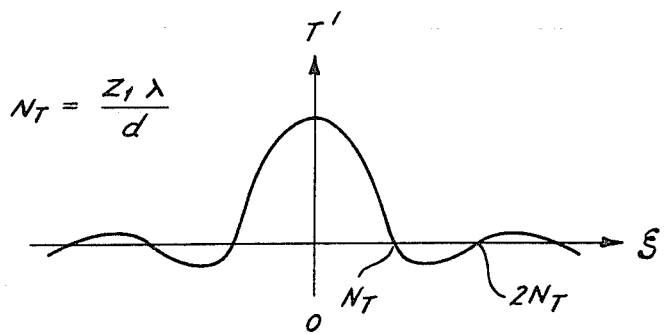
Figure 3C:
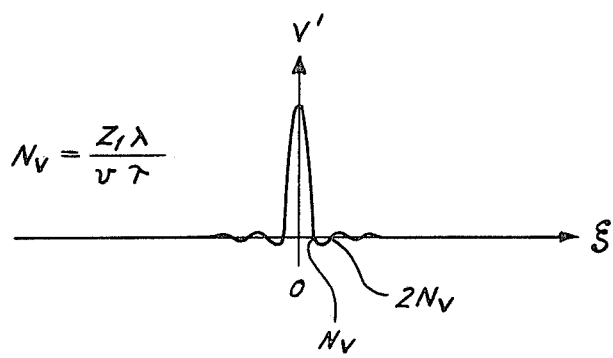

The relationships of Equations (16), (17) and (18) are individually plotted in FIGS. 3A, 3B and 3C, respectively. In making these plots, the value assumed for the $v\pi$ term was deliberately made much greater than the value for the $d$ term. The first $\xi$-axis crossing of the curve of FIG. 3B occurs at a point $N_T$ which is described by the following expression:

$$N_T = z_1\lambda/d \quad (19)$$

This $\xi$-axis crossing occurs when the term within the sine quantity of Equation (17) becomes equal to $\pi$. Subsequent crossings of the $\xi$-axis occur at multiples of $N_T$. The $\xi$-axis crossings for the displacement function curve of FIG. 3C, on the other hand, occur at $N_V$ and multiples thereof, wherein $N_V$ is described by the relationship:

$$N_V = z_1\lambda/v\tau \quad (20)$$

Such crossings occur when the term within the sine quantity of Equation (18) is equal to $\pi$ and multiples thereof.

The net film density variation along the $\xi$-axis is proportional to the product of the three curves shown in FIGS. 3A, 3B and 3C. For purposes of explanation, the lens term $L'$ can be thought of as a carrier signal and the geometry and displacement terms $T'$ and $V'$ can be thought of as signals which modulate the $L'$ carrier. By proper control of the system parameters, either the $T'$ term or the $V'$ term may be caused to be dominant with respect to the other. The one that is dominant will produce the major discernible effect in the resulting hologram pattern. The dominant term will be the one whose distribution curve has the smaller physical area. For the distribution curves of FIGS. 3B and 3C, the $V'$ displacement curve has the smaller physical area and hence the $V'$ term is, in this case, the dominant one. This was accomplished by choosing a value for $v\tau$ which was much greater than the value chosen for the factor $d$. Thus, the $V'$ term makes a $\xi$-axis crossing while the $T'$ term is still experiencing only a slow change. Thus, the first $\xi$-axis crossing of the $v'$ term should be readily discernible in the resulting hologram pattern.

If, on the other hand, the $d$ factor is made larger than the $v\tau$ factor, then the situation is reversed and the $T'$ curve makes its first $\xi$-axis crossing while the $V'$ curve is undergoing only a gradual change. In this case, the dominant effect in the resulting hologram pattern is produced by the $T'$ term, which term represents only the geometry of the object being observed.

Figure 4:
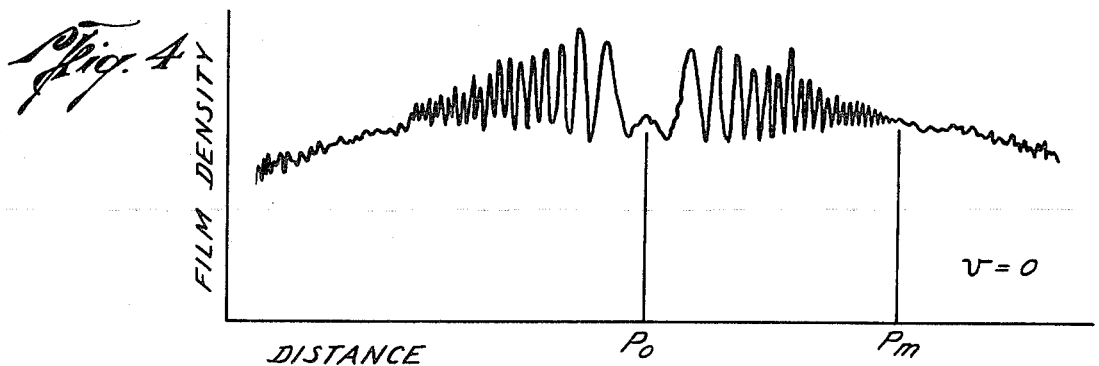
FIGS. 4, 5 and 6 are microdensitometer traces resulting from microdensitometer measurements on hologram patterns obtained for three different particle velocities.
Figure 5:
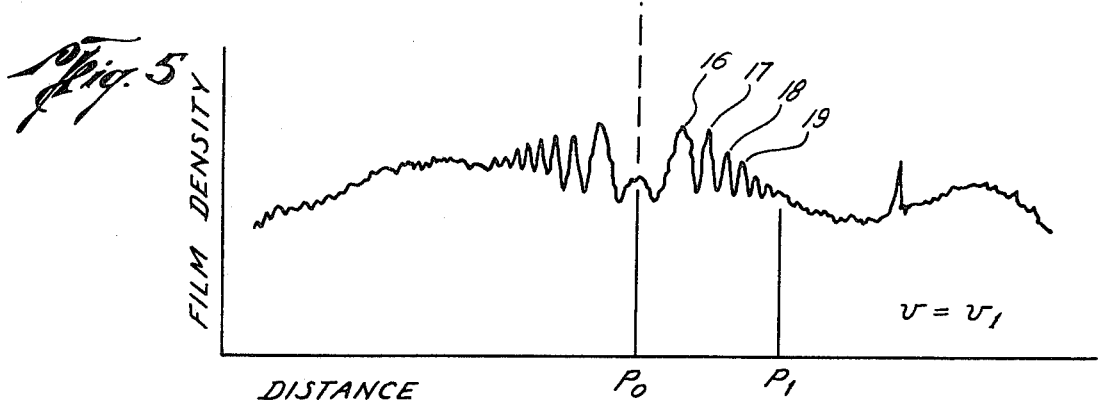
Figure 6:
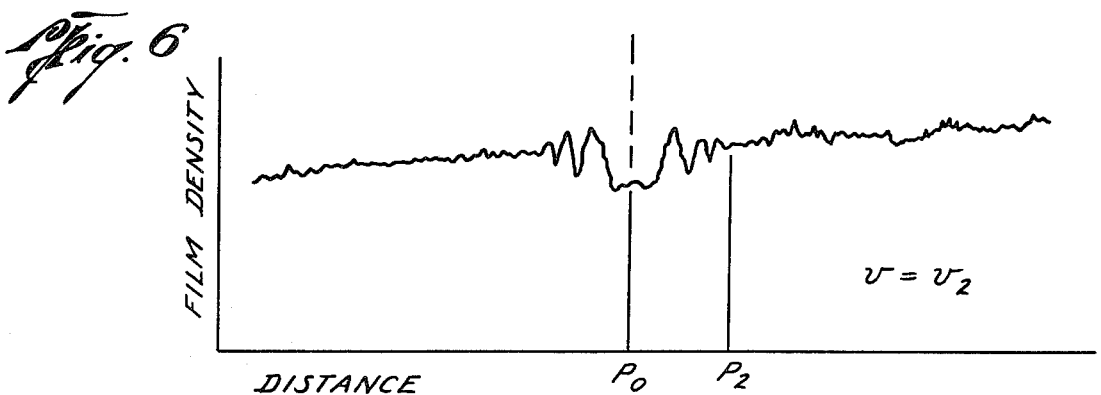

The significance of these considerations can be better appreciated by considering the various microdensitomer traces of FIGS. 4-6. These traces represent the film density variations across the $\xi$-axis of the three developed photographic film segments obtained for three different values of object velocity. FIG. 4 was obtained for the case of an object velocity of zero while FIGS. 5 and 6 were obtained for two different object velocities greater than zero. For the cases depicted in FIGS. 5 and 6, the $v\tau$ factors were greater than the $d$ factor, thus causing the $V'$ velocity function to be the dominant one. Thus, FIGS. 5 and 6 represent examples of the product of $L'$, $T'$ and $V'$ distribution functions of the type shown in FIGS. 3A–3C.

FIG. 4, on the other hand, represents a case where the $T'$ geometry function is dominant. Since the velocity is zero, FIG. 4 represents the product of only the $L'$ and $T'$ functions.

Considering in detail the microdensitometer trace of FIG. 5, the relatively high-frequency wiggles in the trace at 16–19, and so forth, denote the rapid variations of the $L'$ carrier term. The phase reversal at the center point $P_o$ represents the phase reversal of the $L'$ carrier term occurring at the center point in FIG. 3A. The phase reversal occurring at the point $P_1$, on the other hand, represents the phase reversal which occurs when the $v'$ modulation signal of FIG. 3C crosses the $\xi$-axis at $N_v$. Thus, the distance between points $P_o$ and $P_1$ in FIG. 5 is equal to the zero axis crossing distance $N_v$ given by Equation (20). Since the three other factors in Equation (20), namely, $Z_1$, $\lambda$ and $\tau$, are known, this enables a calculation of the velocity $v$. In other words, the distance between the phase reversal points $P_o$ and $P_1$ in FIG. 5 is inversely proportional to the object velocity, with the proportionality constant being a known quantity.

Considering now the microdensitometer trace of FIG. 4, such trace represents the case of an object velocity of zero. Thus, the $V'$ displacement function of FIG. 3C becomes a constant of unity value and the trace of FIG. 4 represents the product of only the $L'$ lens function and the $T'$ geometry function of FIGS. 3A and 3B. As before, the high-frequency wiggles represent the lens term "carrier" signal and the phase reversal at point $P_o$ represents the phase reversal at the center of the lens term carrier function. The phase reversal point at $P_m$ represents the first $\xi$-axis crossing of the $T'$ geometry function of FIG. 3B. Thus, the distance between $P_o$ and $P_m$ represents the $N_T$ factor of Equation (19). Since the factors $z_1$ and $\lambda$ are known, this enables a direct calculation of the mean dimension $d$ of the object.

FIG. 4 is an example of a case where the geometry term is dominant over the displacement term since, in this case, $v\tau$ is not greater than $d$. Since $v\tau$ in this case is zero, there would, of course, be no subsequent phase reversal due to the $\xi$-axis crossing of the $V'$ displacement function. Assume, however, that instead of being equal to zero, the $v\tau$ term had been equal to, say, $0.5d$. Then, in theory, there would be another phase reversal someplace further removed from the $P_o$ point in FIG. 4 corresponding to the $\xi$-axis crossing of the displacement function. As is seen from FIG. 4, however, since this latter phase reversal point would be further removed from $P_o$ than is $P_m$, it would be considerably more difficult to discern the occurrence of such phase reversal point. Also, there is the further complication that the dominant geometry function would have, in the meanwhile, made additional $\xi$-axis crossings before the occurrence of the first crossing for the displacement term. For all practical purposes, therefore, it would become impossible to detect the phase reversal caused by the displacement term. This indicates, in a very graphic manner, the importance of making the displacement term the dominant term, if one is to succeed in discerning the effect of object displacement or movement in the hologram pattern.

The holograms from which the microdensitometer traces of FIGS. 4–6 were obtained were made by moving a very thin wire across the object plane 13 of FIG. 1. The wire was stretched out parallel to the y-axis and was moved at a controlled velocity in the direction of the x-axis. The light source was a continuous-wave helium-neon laser which operated at a wavelength of 6328 Angstroms. The wire was opaque and had a diameter of 109 microns. It was transported by means of a linear actuator having a lead screw which was driven by a variable speed motor. A shutter mechanism was disposed between the object plane 13 and the recording film plane 14 and such shutter mechanism provided an exposure time of 1/125 of a second. The object plane to recording plane distance $z_1$ was 94 centimeters.

The following table compares the $\xi$-axis crossing values calculated from Equations (19) and (20) with the same values as measured from the microdensitometer traces of FIGS. 4–6:

| FIG. No. | Object Velocity | $v\tau/d$ | Calculated $N$ value | Measured $N$ value |
|---|---|---|---|---|
| 4 | 0 | 0 | 5.45 | 5.34 |
| 5 | 2.72 | 2 | 2.72 | 3.05 |
| 6 | 4.09 | 3 | 1.82 | 2.13 |

The above object velocity values are in centimeters per second and the above $N$ values are in millimeters. For FIG. 4, the $N$ value is $N_T$ and the calculated value thereof is calculated from Equation (19) while for FIGS. 5 and 6, the $N$ values are $N_v$ values and the calculated values thereof are calculated from Equation (20).

It is noted from the foregoing table that the agreement between calculated and measured values is not completely perfect and that a small amount of error exists. This is believed to be due to inaccuracies in calibration of the lead screw of the linear actuator, the speed of the driving motor, and the speed of the mechanical shutter mechanism, as well as to inaccuracies in locating with precision the phase reversal points on the microdensitometer traces. Nevertheless, the correlation is sufficiently close to verify the validity of the procedure.

As previously indicated, certain limitations must be carefully observed in order to be able to discern the effect of object motion in the resulting hologram pattern recorded on the film 14 (or on the image reconstructed from such hologram pattern). These critical limitations are as follows:

$$z_1 \geq R^2/\lambda \tag{21}$$

$$z_1 \leq 100(d^2/\lambda) \tag{22}$$

$$v\tau \leq 10d \tag{23}$$

$$v\tau > d \tag{24}$$

Equation (21) is the same as Equation (10) previously considered. In a qualitative sense, it says that the path length of the object during the exposure time must be small as compared to the distance $z_1$ between the object and recording planes. For the case of a $z_1$ value of 94 centimeters and a $\lambda$ value of 6328 Angstroms given above, this means that the path length $R$ must be equal to or less than 0.75 millimeters. Since the object is moving, this, in turn, means that the mean dimension $d$ of the object in the direction of movement must also be small as compared to the object-to-recording plane distance $z_1$.

Equation (22) describes a further condition which must be satisfied for the case of Fraunhofer type holography. The relationship of Equation (22) must be satisfied in order to achieve a usable signal-to-noise ratio in the recorded fringe pattern. In a qualitative sense, it says that the mean dimension of the object must be at least a certain minimum size or else the "-signal" resulting therefrom will be lost in the noise. This signal-to-noise limitation is discussed in the DeVelis and Reynolds text cited above.

Equation (23) is derived from Equations (21) and (22) and relates the path length to the signal-to-noise limitation, it being remembered that the path length R is equal to $v\tau$ for the case of a constant velocity. In a qualitative sense, Equation (23) says that if the velocity is too great, then the contrast produced by the object on the photographic film is insufficient to make the movement effect discernible.

Equation (24) states the necessary condition previously considered for making the displacement term $V$ dominant over the geometry term $T$.

If the 24) of Equations (21) through (24) are not observed, then it will not be possible to distinguish the effect of the object movement in the recorded hologram.

The various steps of the foregoing mathematical derivation are set forth in greater detail in a Technical Note written by applicant entitled "The Effect of Object Motion in Fraunhofer Holography with Application to Velocity Measurements", published by National Aeronautics and Space Administration, Washington, D. C., as NASA Technical Note D-5515, dated September 1969. Such Technical Note is hereby incorporated herein by this reference thereto.

At this point, it is helpful to briefly summarize the manner of practicing the present embodiment of the invention. As indicated in FIG. 1, the particle or particles being investigated are allowed to pass between a coherent light source 10 and a photographic film 14. The source 10 and film 14 are arranged so that these particles move in planes which are predominantly at right angles to the optical axis $Z$ of the recording system. The coherent light source 10 is caused to illuminate both the particles and the photographic film 14 for a short interval of time while the particles are between the source 10 and the film 14. The length of this exposure time is made to satisfy the conditions of Equations (23) and (24) set forth above. As indicated from such equations, a given exposure time $\tau$ will cover a 10:1 velocity range. In most cases, there will be some prior knowledge of the approximate velocity range to be expected and the exposure time can be adjusted accordingly. If such prior knowledge is not available, then it may be necessary to make successive adjustments of the exposure time until the proper value is obtained. After the photographic film 14 has been properly exposed, it is then developed in the usual manner by means of the usual chemical solutions. The recorded interference fringes constituting the hologram pattern are then ready for analysis.

For the case where only one particle at a time is recorded, the analysis can be performed by obtaining a microdensitometer trace from the developed film. This is accomplished by scanning the developed film along a given line thereof with a microdensitometer instrument, which instrument provides an output signal proportional to the light transmission coefficient or photographic density of the film along the lines being scanned. This signal is recorded by a moving chart type recorder to provide a microdensitometer trace of the type considered in FIGS. 4-6. The velocity is then determined by measuring the separation distance between the center and next adjacent phase reversal points on such microdensitometer trace. This separation distance gives the $N_V$ factor of Equation (20), from which relationship the velocity $v$ is determined. Where the $Z_1$, $\lambda$ and $\tau$ factors of Equation (20) remain fixed for an extended series of measurements, then the microdensitometer traces can be scaled directly in terms of velocity.

For the cases where a goodly number of particles are recorded during the same exposure interval or where the particles may pass between the light source and the film at different $z_1$ distances, then it is preferred to use a different manner of analysis. In such cases, it is preferred to reconstruct the image represented by the interference pattern recorded on the film. This is accomplished by illuminating the developed film with coherent light of the same wavelength as used in recording the interference pattern. This produces a three-dimensional image of the original scene. Since the particle or particles were moving when recorded, each reproduced particle image is in the form of a streak corresponding to the loci of points occupied by the particle during the exposure time. In terms of FIG. 2, the reconstructed image for a single particle is in the form of a streak of length $R$ and width $d$. Thus, the velocity is determined by measuring the path length $R$ in the reconstructed image and dividing such path length by the exposure time $\tau$.

This image reconstruction technique offers several advantages. For one thing, there is no need to know the values of the $z_1$ and $\lambda$ factors. These two factors in a plane wave construction and reconstruction process control only the distance from the film to the image plane. This image plane is located visually by seeking the sharpest focus in the reconstructed image for the particular particle being studied. In addition, because of the three-dimensional nature of the reconstructed image scene, any particular particle in a group of particles can almost always be observed without obstruction by viewing same from the appropriate viewing angle.

Figure 7:
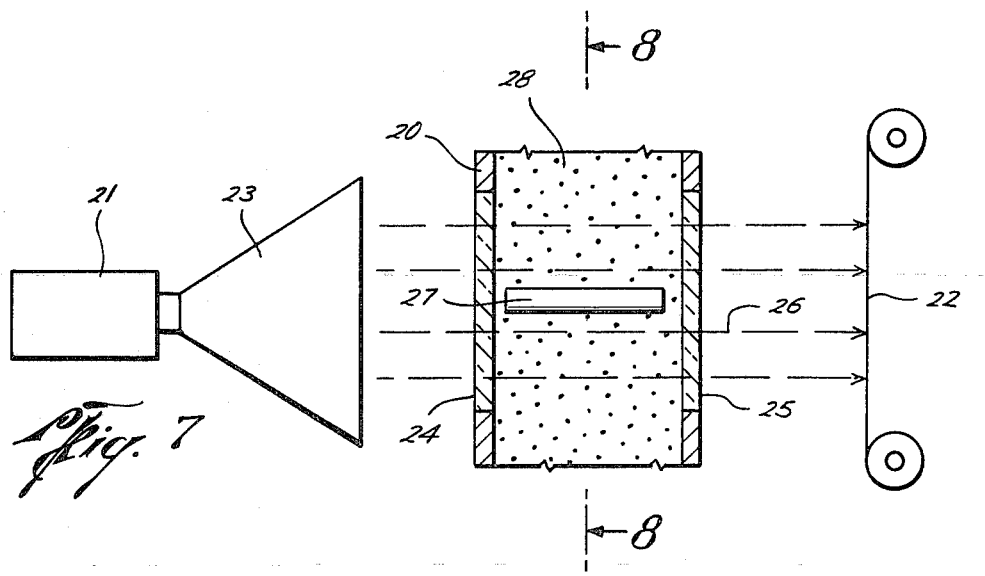
FIG. 7 shows one manner of using the present invention to perform a flow study.
Figure 8:
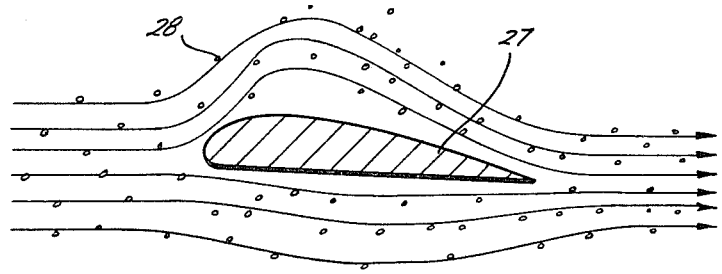
FIG. 8 is a cross-sectional view taken along section line 8—8 of FIG. 7 and more clearly showing the movement of the particle seeded fluid stream relative to the wing model being studied.

Referring now to FIGS. 7 and 8, there will be described one manner of using the method of the present invention to perform a flow study. As indicated in FIG. 7, a test chamber 20 is disposed between a pulsed laser source 21 and a length of photographic film 22. An autocollimator 23 is placed at the output window of the laser 21 and the test chamber 20 is provided with observation windows 24 and 25. As a result, the parallel rays 26 of the plane-wave light from the autocollimator 23 are caused to pass through windows 24 and 25 and to fall on the photographic film 22. A model to be studied, in this case a section of an aircraft wing or airfoil 27, is mounted within the test chamber 20 in the optical viewing path. A stream of fluid seeded with many small micron-size particles 28 is then caused to flow through the test chamber 20 at right angles to the optical axis of the hologram recording system or, in other words, at right angles to the plane of the paper in FIG. 7.

FIG. 8 is a view taken at right angles to the view of FIG. 7. As seen in FIG. 8, the particles 28 follow the flow lines of the fluid stream as it passes over the airfoil 27.

Figure 9:
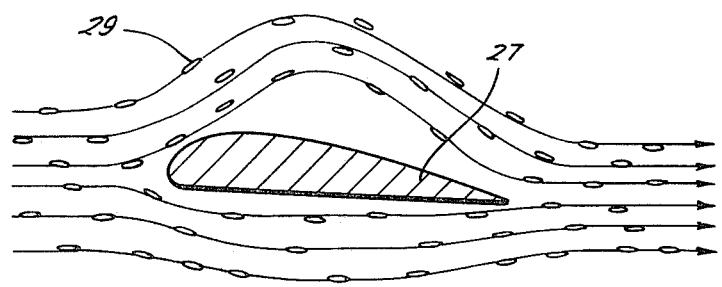
FIG. 9 is a conceptual illustration of the reconstructed hologram image obtained for the original object scene of FIG. 8.

The laser 21 is pulsed to expose the photographic film 22 for the proper exposure time, which exposure time is selected to meet the limiting conditions set forth above. The other pertinent parameters of the FIG. 7 apparatus are also constructed to meet the necessary conditions set forth above. After the exposure thereof, the film 22 is developed and an image is thereafter reconstructed from such developed film. This reconstructed image is represented in FIG. 9. As there seen, there are produced, in place of the particles 28, elongated streaks 29 corresponding to the loci of points occupied by the different particles during the exposure time. By measuring the lengths of these individual streaks 29, the individual velocities at the different points in the test chamber 20 are determined. It is noted that in the illustration of FIG. 9 no effort was made to proportion these path lengths in accordance with the velocities that would actually be encountered. Also, FIG. 9 represents the image obtained by focusing on a given plane within the reconstructed three-dimensional image. (Though not shown, fringing will be present around the boundary of the airfoil since, due to its larger size, it is in the near field of the recording plane.) Other planes would be observed in a similar manner by changing the focal length at which the reconstructed image is viewed.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A method of measuring the velocity of a small moving object comprising:
    allowing the object to pass between a coherent light source and a photographic film;
    causing the light from said light source to travel in a plane wave in a direction substantially perpendicular to the plane of the photographic film;
    causing the light source to illuminate the film for a short interval of time while the object is between the source and the film to thereby record a hologram pattern on the film;
    making the exposure time of such duration that the object moves a distance greater than $d$ but not greater than $10d$ during the exposure time and wherein the shortest distance between the object and the plane of the film during the exposure time is equal to or greater than $R^2/\lambda$ but is not greater than $100d^2/\lambda$, where $R$ denotes the path length of the object during the exposure time, $d$ denotes the mean dimension of the object in the direction of movement and $\lambda$ denotes the wavelength of the light from the light source;
    developing the photographic film; and
    analyzing the resulting hologram pattern on said film to determine therefrom the velocity of the moving object.

2. The method of claim 1 wherein the object moves in a plane substantially parallel to the plane of the photographic film.

3. The method of claim 1 wherein the light source is a laser.

4. The method of claim 3 wherein a collimator device is located intermediate the laser and the region of movement of the object for collimating said light for illuminating both the object and the photographic film with light of a plane wave character.

5. The method of claim 3 wherein the exposure time is determined by using a pulsed laser and providing same with the proper pulse width.

6. The method of claim 3 wherein the exposure time is determined by a shutter mechanism disposed across the light path intermediate the laser and the photographic film.

7. The method of claim 1 wherein the analysis of the hologram pattern comprises the steps of:
    making microdensitometer measurements across the developed film;
    and determining from the microdensitometer measurements the velocity of the moving object.

8. The method of claim 7 wherein the microdensitometer measurements are made by scanning the developed film along a given line with a microdensitometer and recording the microdensitometer signal to provide a microdensitometer trace representing the variation in film density along such line and wherein the velocity is determined by measuring the separation distance between phase reversal points on the microdensitometer trace.

9. The method of claim 1 wherein the analysis of the hologram pattern comprises the steps of:
    reconstructing an image by illuminating the developed film with coherent light;
    and determining from the reconstructed image the velocity of the moving object.

10. The method of claim 9 wherein the velocity is determined by measuring the path length of the object in the reconstructed image.

11. A method of measuring the velocities of individual particles in a stream of many small moving particles comprising:
    allowing the stream of particles to pass between a coherent light source and a photographic film;
    causing the light from said light source to travel in a plane wave in a direction substantially perpendicular to the plane of the photographic film;
    causing the light source to illuminate the film for a short interval of time while the particles are between the source and the film to thereby record a hologram pattern on the film;
    making the exposure time of such duration that each particle moves a distance greater than $d$ but not greater than $10d$ during the exposure time and wherein the shortest distance between the object and the plane of the film during the exposure time is equal to or greater than $R^2/\lambda$ but is not greater than $100d^2/\lambda$, where $R$ denotes the path length of the object during the exposure time, $d$ denotes the mean dimension of the object in the direction of movement and $\lambda$ denotes the wavelength of the light from the light source;

developing the photographic film;
reconstructing an image by illuminating the developed film with coherent light;
measuring the path lengths of the individual particles in the reconstructed image; and
determining the velocities of the individual particles from said measurements.

* * * * *